L. M. EDMONDS AND B. E. SCOTT.
CARRYING RECEPTACLE FOR AUTOMOBILES.
APPLICATION FILED JAN. 20, 1920.
1,356,274.
Patented Oct. 19, 1920.
2 SHEETS—SHEET 1.
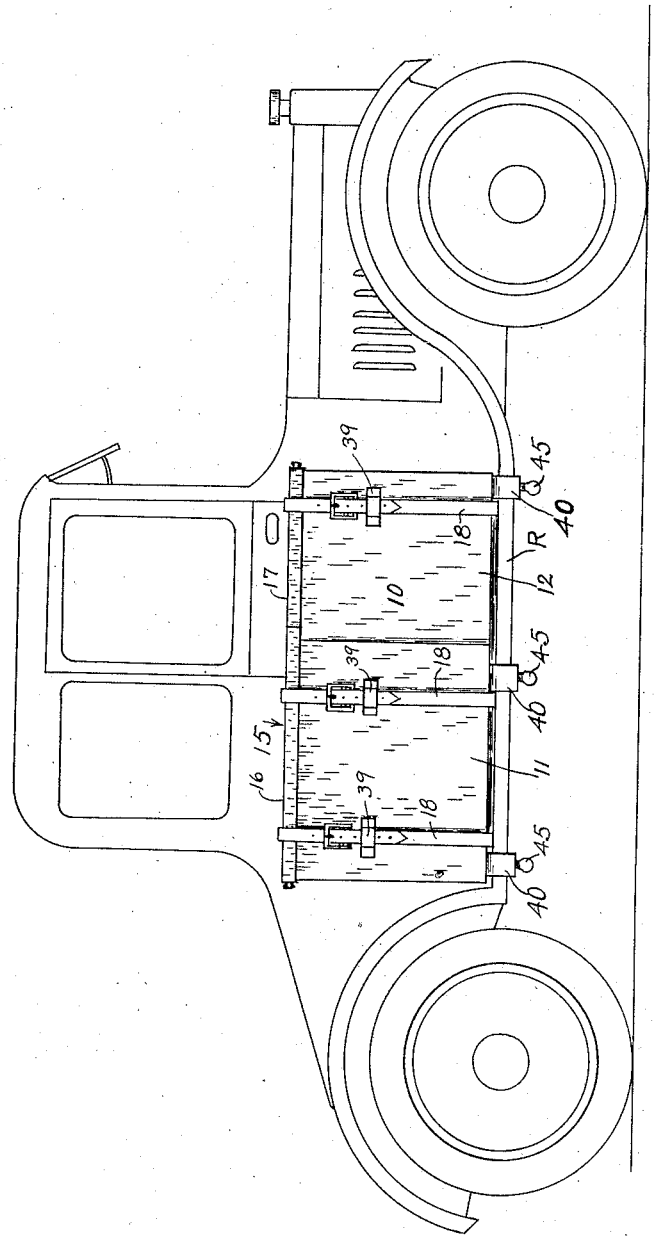
INVENTORS
Laura M. Edmonds,
Blanche E. Scott,
BY Baker & Macklin,
ATTORNEYS L. M. EDMONDS AND B. E. SCOTT.
CARRYING RECEPTACLE FOR AUTOMOBILES.
APPLICATION FILED JAN. 20, 1920.
1,356,274.
Patented Oct. 19, 1920.
2 SHEETS—SHEET 2.
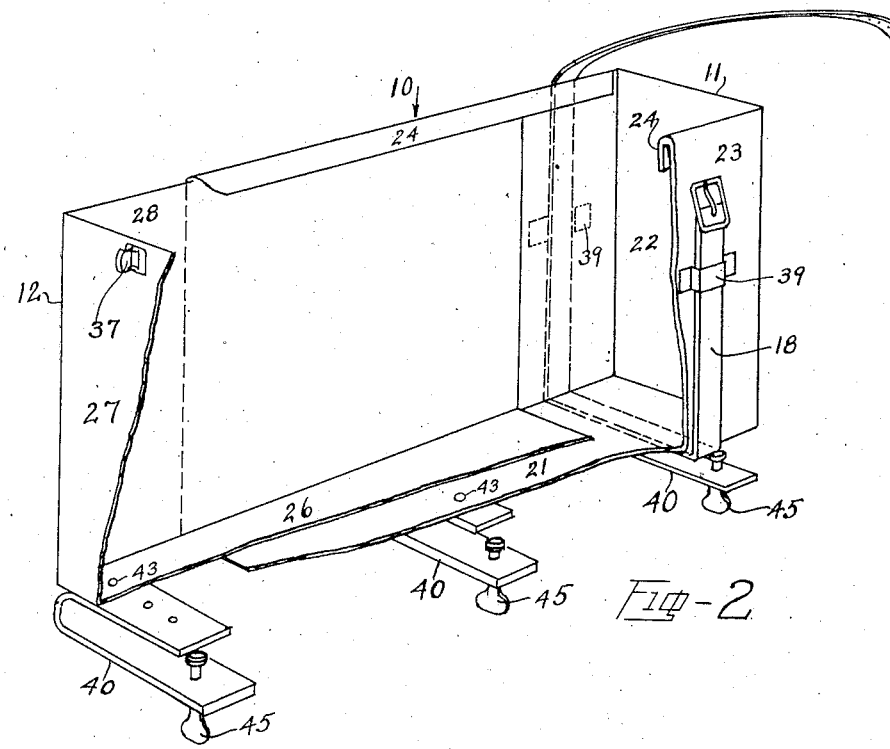
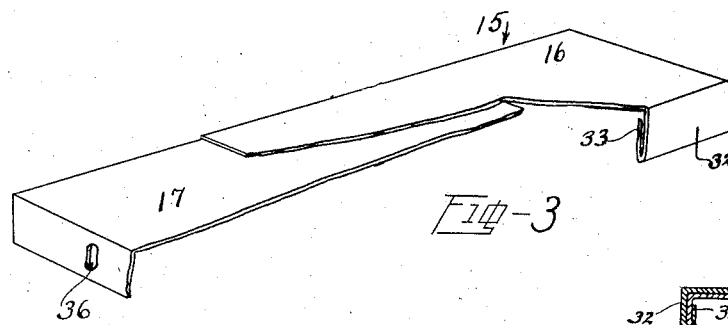
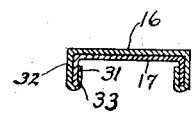
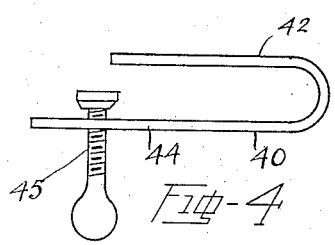
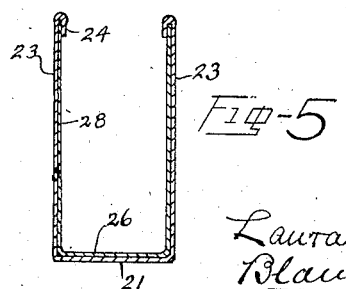
INVENTORS
Laura M. Edmonds,
Blanche E. Scott,
BY Baker & Mocklin,
ATTORNEYS

UNITED STATES PATENT OFFICE.

LAURA M. EDMONDS AND BLANCHE E. SCOTT, OF CLEVELAND, OHIO.

CARRYING-RECEPTACLE FOR AUTOMOBILES.

1,356,274. Specification of Letters Patent. Patented Oct. 19, 1920.

Application filed January 20, 1920. Serial No. 352,777.

*To all whom it may concern:*

Be it known that we, LAURA M. EDMONDS and BLANCHE E. SCOTT, citizens of the United States, residing in Cleveland, county of Cuyahoga, and State of Ohio, have invented a certain new and useful Improvement in Carrying-Receptacles for Automobiles, of which the following is a full, clear, and exact description, reference being had to the accompanying drawings.

This invention relates to a telescopic receptacle adapted to be clamped to the running board of an automobile.

An object of our invention is the provision of a "carryall" box which may be securely clamped to an automobile running board and which is extensible to meet demands for increased capacity whenever desirable, and be reduced in size when the contents require less space.

Another object is the provision of means whereby a portion of the clamping means for securing the device to the automobile, may be used as a locking means to retain the telescopic portions of the box in any adjusted position. These and other objects and features will become more apparent as the description proceeds. The essential characteristics of the invention are summarized in the claim.

A preferred embodiment of our invention is illustrated in the accompanying drawings wherein Figure 1 shows a receptacle and its attaching means constituting our invention, applied to the running board of an automobile; Fig. 2 is a perspective of the box and clamping means, looking from the automobile and parts being broken away; Fig. 3 is a similar view of the cover for the box; Fig. 4 is an elevation of the clamping means; Fig. 5 is a transverse section through the telescoping parts of the box, and Fig. 6 is a similar view through the cover.

Referring to the drawings by numeral, 10 designates the body of the box, preferably of sheet metal construction, composed of two portions 11 and 12 telescoping longitudinally. The box is provided with a cover 15 comprising similarly telescoping members 16 and 17, which cover may be secured tightly to the box by end fasteners (hereinafter described) and straps 18. Both portions of the box 10 have secured to their bottom members clamping means illustrated in Fig. 4, whereby they may be secured to a running board R of an automobile.

The two parts 11 and 12 of the box 10 each comprise open ended members, one of which is adapted to fit closely and slide within the other. The part 11 comprises a bottom wall 21, and end wall 22 and side walls 23. The top edges of the side walls 23 are flanged by turning over a portion 24 as illustrated in Figs. 2 and 5.

The part 12 has a bottom wall 26, end wall 27 and side walls 28. The bottom and end walls are identical with the corresponding members of the part 11 except that they are slightly smaller, as are also the sides 28. The latter however, have no flanges at their upper edges but terminate in a single thickness of material. This construction permits the walls 28 to slide between the walls 23 and the flanged portions 24, which serve as guides, when the part 12 is telescoped within the part 11.

The cover 15 comprises a relatively shallow member, also comprising two telescoping parts, which is adapted to fit closely over the sides and ends of the box 10. The parts 16 and 17 of the cover are constructed similarly to the parts 11 and 12 respectively of the box, differing only in their dimensions, the sides 31 of the part 17 being adapted to slide between the side walls 32 of the part 16 and turned up flanged portions 33 constituting guide members therefor.

Catches are provided for securely fastening the ends of the cover to the ends of the box. As shown, the parts 16 and 17 of the cover may have openings 36 in their end walls adapted to be occupied by curtain snaps or other fasteners 37 near the upper edge of the end walls 22 and 37 of the box 10, and which may be turned after passing through the openings 36 to secure the cover members to the corresponding members of the box. The straps 18 may be also provided to aid in securing the cover to the box. These straps may pass around the box and lid through keepers 39 secured to the walls of the box. As shown, the outside telescoping parts 11 and 16 of the box and cover respectively, are surrounded by two straps 18 while the parts 12 and 17 slidable within them are embraced by a single strap. If desired one or more of these straps may also be passed through or around a suitable portion of the automobile body to aid in securing the box and prevent rattling.

The clamping means for securing the box to the running board comprises U-shaped members 40 adapted to embrace the running board R with the upper arms 42 riveted as at 43 to the bottom of the box and the lower arms 44 adapted to engage the under surface of the running board. As shown, two of these clamping devices are employed to secure the outer part 11 of the box to the running board and a third is used with the part 12. Through openings in the lower arms 44 are threaded thumb screws 45 which may be tightened against the under side of the running board to hold the box securely thereto.

When it is desired to vary the capacity of the box, the clamp 40 secured to the part 12 is loosened to permit this part to be adjusted longitudinally within the part 11 and along the running board R. By simply tightening the thumb screw 45 it may be securely held in this adjusted position.

From the foregoing, it will be apparent that we have provided a receptacle which may be quickly and securely fastened to a running board of an automobile, made adjustable to give varying capacity as desired, and retained in its adjusted position by the same means used to attach it to the automobile, thus affording a very convenient and practicable luggage carrier.

Having described our invention, we claim:

A carrying receptacle for automobiles, comprising a body having two open ended longitudinally telescoping portions, a lid having two parts similarly constructed and joined, means for securing said lid to said body, comprising coöperating members, one of said members being a projection secured at each end of the body, a plurality of straps extending transversely of and around the outer telescoping members, at least two of said straps being positioned on the outer members, and one on the inner member, whereby the straps are substantially equally spaced when the body is extended, and means for clamping the receptacle to the running board of an automobile, comprising metal strips secured to and extending transversely the full width of the receptacle, and extending downwardly and adapted to reach under the running board, and having a clamping element for engaging the running board near the inner edge thereof, there being a plurality of such strips on the outer telescoping member and one strip near the end of the inner member.

In testimony whereof, we hereunto affix our signatures.

LAURA M. EDMONDS.
BLANCHE E. SCOTT.